United States Patent
Tai et al.

(10) Patent No.: US 8,729,724 B2
(45) Date of Patent: May 20, 2014

(54) EDDY-TYPE WIND POWER GENERATOR

(75) Inventors: Chang-Hsien Tai, Pingtung County (TW); Shi-Wei Lo, Pingtung County (TW); Uzu-Kuei Hsu, Pingtung County (TW)

(73) Assignee: National Pingtung University of Science & Technology, Neipu Hsiang (TW)

( * ) Notice: Subject to any disclaimer, the term of this patent is extended or adjusted under 35 U.S.C. 154(b) by 249 days.

(21) Appl. No.: 13/251,321

(22) Filed: Oct. 3, 2011

(65) Prior Publication Data

US 2013/0038067 A1    Feb. 14, 2013

(30) Foreign Application Priority Data

Aug. 9, 2011   (TW) ............................. 100128429 A

(51) Int. Cl.
*F03D 9/00* (2006.01)
(52) U.S. Cl.
USPC .............................................. 290/55; 290/54
(58) Field of Classification Search
USPC ............. 290/43, 44, 54, 55; 415/4.1, 2.1, 4.2, 415/4.3, 4.5, 907, 905, 908
See application file for complete search history.

(56) References Cited

U.S. PATENT DOCUMENTS

| | | | | |
|---|---|---|---|---|
| 4,398,096 A | * | 8/1983 | Faurholtz | 290/55 |
| 4,452,046 A | * | 6/1984 | Valentin | 60/641.11 |
| 4,452,562 A | * | 6/1984 | Hsu | 415/208.1 |
| 5,483,798 A | * | 1/1996 | Prueitt | 60/675 |
| 7,239,037 B2 | * | 7/2007 | Alstot et al. | 290/54 |
| 7,663,261 B2 | * | 2/2010 | Miller et al. | 290/54 |
| 7,794,196 B2 | * | 9/2010 | Demontmorency | 415/4.3 |
| 7,798,684 B2 | | 9/2010 | Boissevain | |
| 7,821,151 B2 | | 10/2010 | Le et al. | |
| 8,207,625 B1 | * | 6/2012 | Cristo | 290/55 |
| 2003/0156938 A1 | * | 8/2003 | Verini | 415/4.2 |
| 2003/0201646 A1 | * | 10/2003 | Kaploun | 290/54 |
| 2009/0160193 A1 | * | 6/2009 | Farb | 290/54 |
| 2010/0237620 A1 | * | 9/2010 | West | 290/52 |
| 2010/0244453 A1 | * | 9/2010 | Dornan | 290/55 |
| 2011/0163545 A1 | * | 7/2011 | Hirai et al. | 290/44 |
| 2011/0175366 A1 | * | 7/2011 | Steinlechner | 290/55 |
| 2013/0001951 A1 | * | 1/2013 | Tai et al. | 290/55 |
| 2013/0038068 A1 | * | 2/2013 | Tai et al. | 290/55 |
| 2013/0043689 A1 | * | 2/2013 | Tai et al. | 290/55 |

* cited by examiner

*Primary Examiner* — Tulsidas C Patel
*Assistant Examiner* — Viet Nguyen
(74) *Attorney, Agent, or Firm* — Alan Kamrath; Kamrath IP Lawfirm, P.A.

(57) ABSTRACT

An eddy-type wind power generator includes an inlet tube, an outlet tube and an electricity-generating assembly. The inlet tube has a first end and a second end. The first end has an inlet, an eddy opening and a plurality of air-guiding holes. An intake air channel is formed inside the inlet tube. The outlet tube receives the inlet tube and has an opening end and a closed end. An exhaust channel is formed between the inlet tube and the outlet tube. A gap is formed between the closed end of the outlet tube and the second end of the inlet tube. The exhaust channel communicates with the intake air channel via the gap. The electricity-generating assembly is disposed in the intake air channel of the inlet tube.

10 Claims, 5 Drawing Sheets

EDDY-TYPE WIND POWER GENERATOR

BACKGROUND OF THE INVENTION

1. Field of the Invention

The present invention generally relates to a wind power generator and, more particularly, to an eddy-type wind power generator that introduces eddy currents to improve airflow smoothness.

2. Description of the Related Art

Wind power generation has been a very important renewable energy that provides human with required electricity while meeting the requirements of environmental protection at the same time. In wind power generation, natural wind drives an axial-flow type impeller to rotate. In turn, the rotating impeller drives a generator to generate electricity. This is an environmental-friendly power generation mechanism that generates electricity without harming the environment.

FIG. 1 shows a conventional tube-type wind power generator having a tube 8 and an axial-flow generator 9. The tube 8 collects air, allowing the air to flow therein. This enables the axial-flow generator 9 to receive the airflow, increasing the output capacity of the axial-flow generator 9. Thus, electricity generation by wind power is completed.

However, the tube-type wind power generator in FIG. 1 has some drawbacks as described below. When air enters the tube 8, high air pressure is formed in the tube 8 where the tube 8 bends due to squeezing of air. For example, a first high pressure area 81 and a second high pressure area 82 are formed, creating high pressure turbulences at the first and second high pressure areas 81 and 82. The high pressure turbulences make the air enter the tube 8 with less smoothness. As a result, the tube 8 does not collect the air efficiently, resulting in insufficient wind energy in driving the axial-flow generator 9. Therefore, the output of the wind power generator is limited.

Besides, when the incoming air flows in the tube 8, the air is stronger closer to a central axis of the tube 8. As a result, since the blades of the axial-flow generator 9 are closer to an inner circumferential wall of the tube 8 where the air is less strong, the blades of the axial-flow generator 9 cannot be efficiently driven by the air, limiting the performance of the axial-flow generator 9. Thus, shaft work of the axial-flow generator 9 is reduced, lowering the electricity of the axial-flow generator 9 generated by the shaft work.

SUMMARY OF THE INVENTION

It is therefore the primary objective of this invention to provide an eddy-type wind power generator capable of reducing high pressure turbulences taking place in a tube of the generator, thereby allowing the incoming air to enter the tube with greater smoothness.

It is another objective of this invention to provide an eddy-type wind power generator increasing the driving force of a plurality of blades thereof by introducing eddy currents.

The invention discloses an eddy-type wind power generator comprising an inlet tube, an outlet tube and an electricity-generating assembly. The inlet tube has a first end and a second end. The first end has an inlet, an eddy opening and a plurality of air-guiding holes. An intake air channel is formed inside the inlet tube. The outlet tube receives the inlet tube and has an opening end and a closed end. An exhaust channel is formed between the inlet tube and the outlet tube. A gap is formed between the closed end of the outlet tube and the second end of the inlet tube. The exhaust channel communicates with the intake air channel via the gap. The electricity-generating assembly is disposed in the intake air channel of the inlet tube.

BRIEF DESCRIPTION OF THE DRAWINGS

The present invention will become more fully understood from the detailed description given hereinafter and the accompanying drawings which are given by way of illustration only, and thus are not limitative of the present invention, and wherein.

Figure 1:
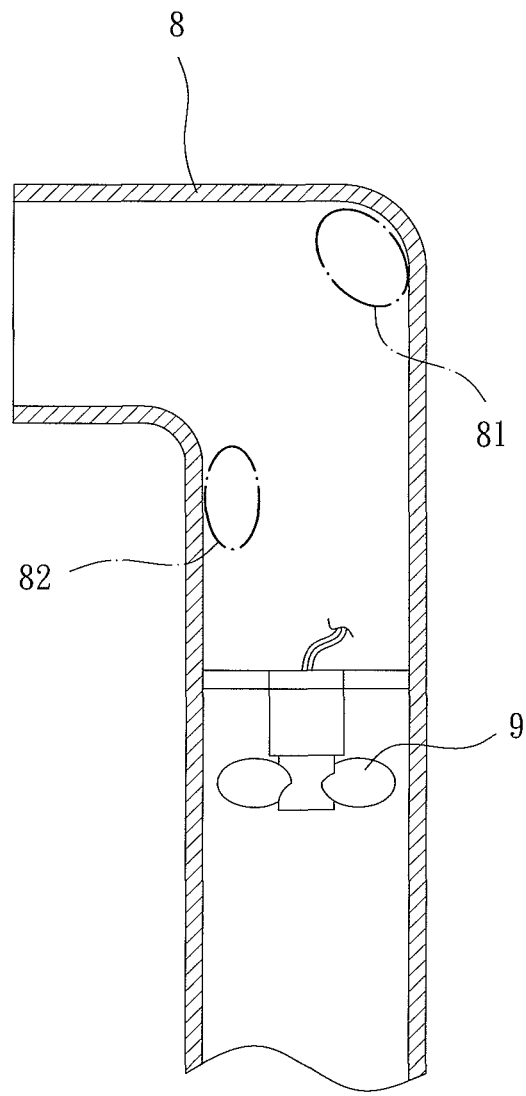
FIG. 1 shows a conventional tube-type wind power generator.

In the various figures of the drawings, the same numerals designate the same or similar parts. Furthermore, when the terms "first", "second", "third", "fourth", "inner", "outer" "top", "bottom" and similar terms are used hereinafter, it should be understood that these terms refer only to the structure shown in the drawings as it would appear to a person viewing the drawings, and are utilized only to facilitate describing the invention.

DETAILED DESCRIPTION OF THE INVENTION

Figure 2:
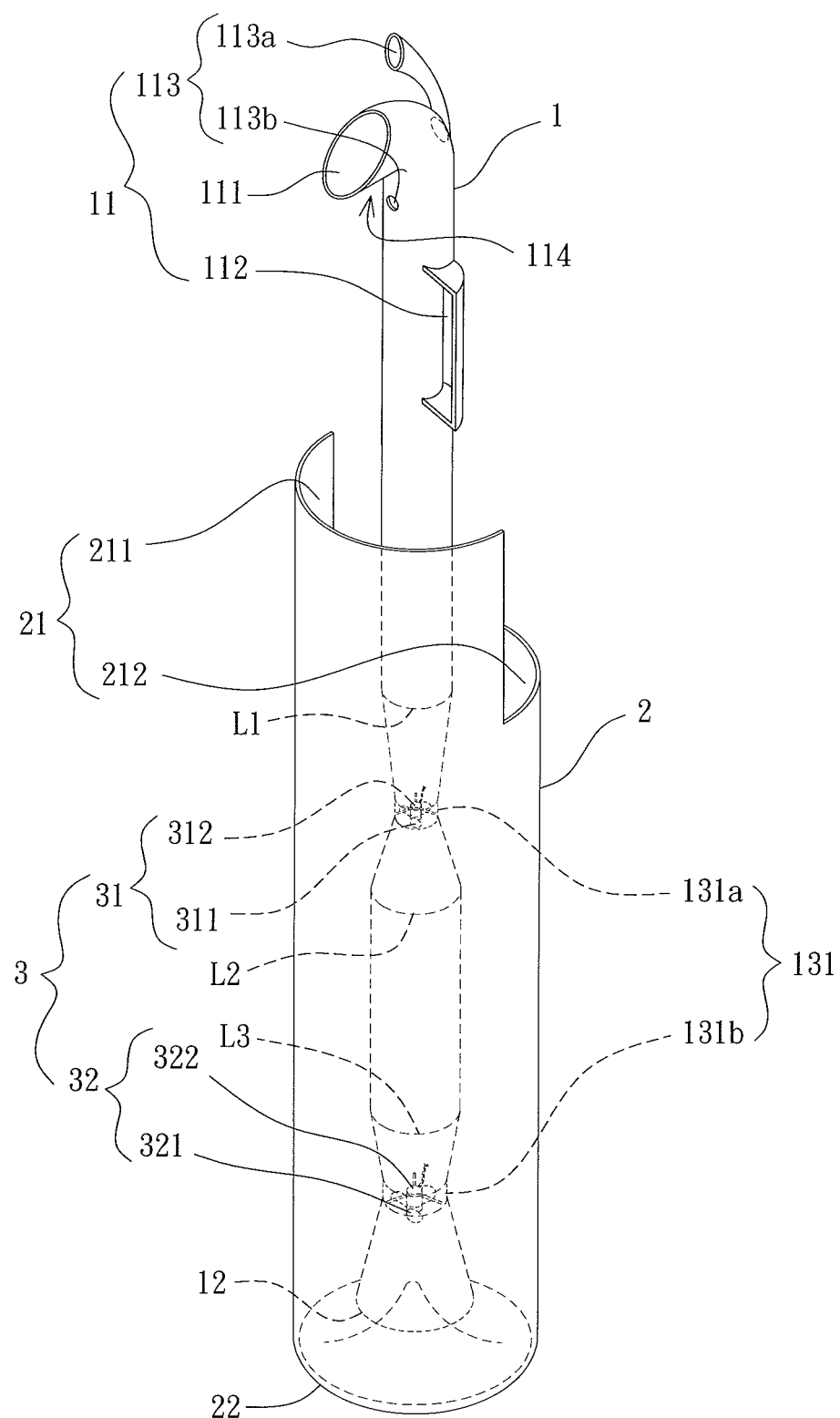
FIG. 2 is an exploded view of an eddy-type wind power generator according to a preferred embodiment of the invention.
Figure 3:
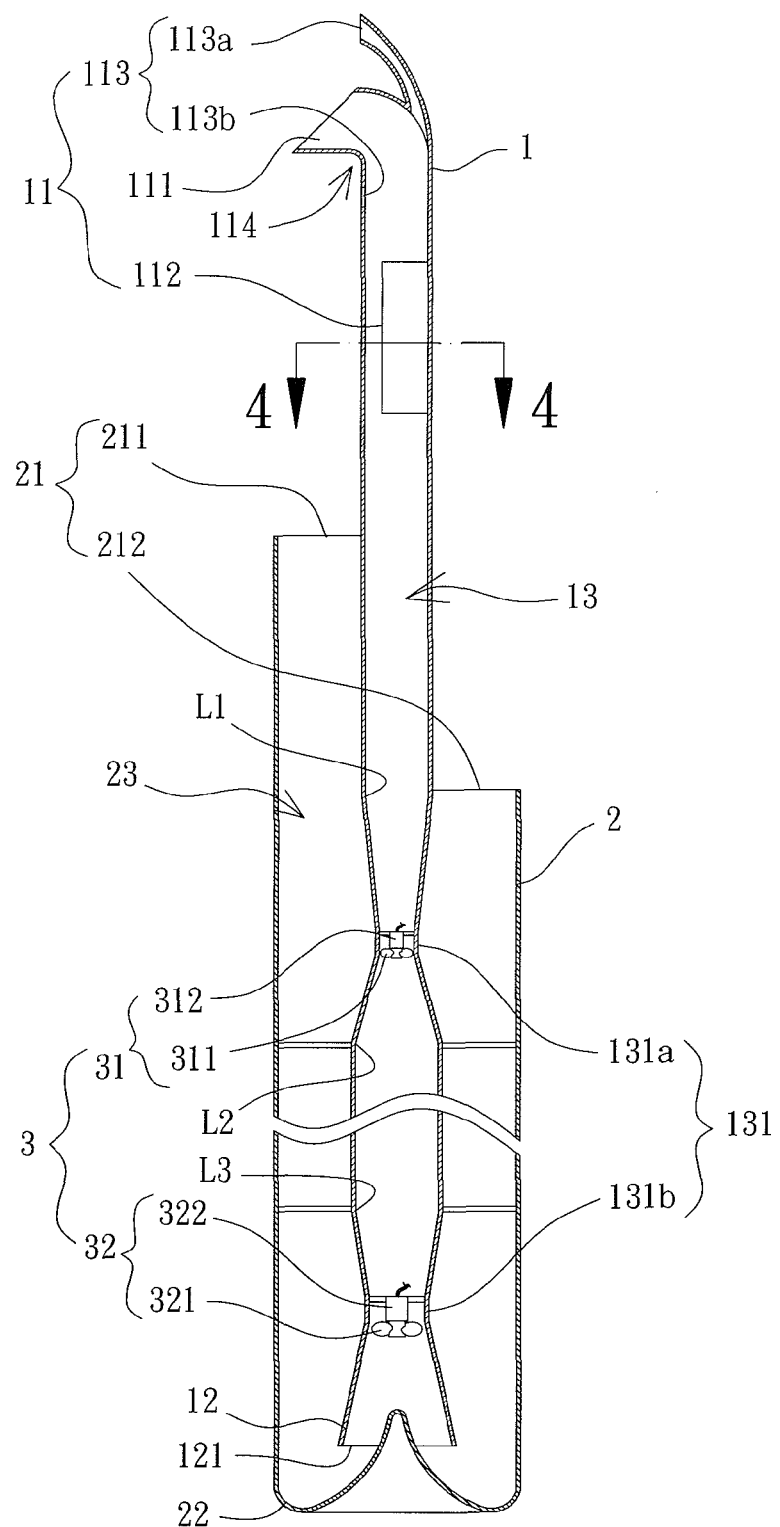
FIG. 3 is a cross-sectional view of the eddy-type wind power generator of the invention.

Referring to FIGS. 2 and 3, an eddy-type wind power generator including an inlet tube 1, an outlet tube 2 and an electricity-generating assembly 3 is disclosed according to a preferred embodiment of the invention. The outlet tube 2 receives the inlet tube 1. The electricity-generating assembly 3 is disposed in the inlet tube 1.

Figure 4:
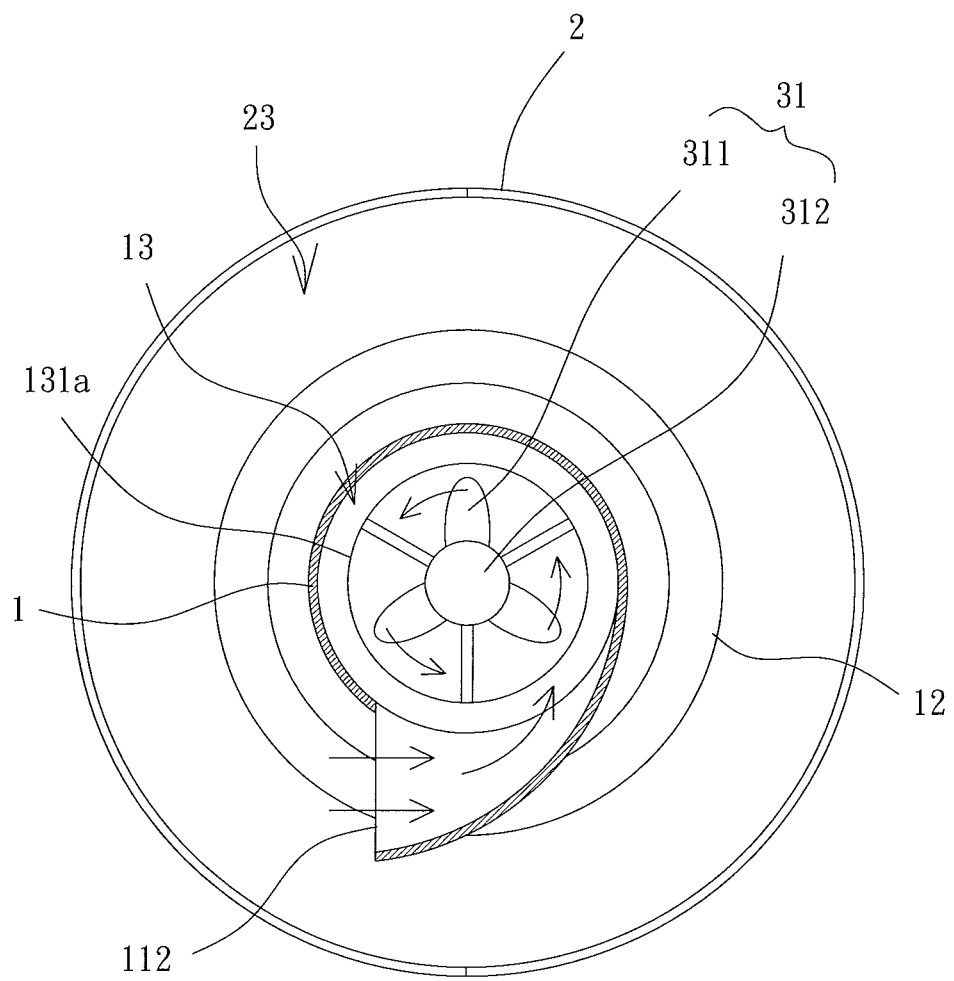
FIG. 4 shows a path of the air entering the eddy-type wind power generator via an eddy opening of the eddy-type wind power generator, observed at a top side of the generator.

The inlet tube 1 is a hollow tube having a first end 11 and a second end 12. The first end 11 has an inlet 111, an eddy opening 112 and at least one set of air-guiding holes 113. The inlet 111 has an inclined periphery and is preferably set in a direction facing the wind for air collection. The inclined periphery of the inlet 111 is formed in a way that the lower the part of the inclined periphery, the longer the distance to a central axis of the inlet tube 1. In other words, the upper portion of the inclined periphery has a shorter distance to the central axis of the inlet tube 1, whereas the lower portion of the inclined periphery has a longer distance to the central axis of the inlet tube 1. In such an arrangement, the inlet 111 can collect air in a more efficient way. The eddy opening 112 is preferably set in the same direction as the inlet tube 1 to better receive air. The eddy opening 112 is preferably arranged on an outer circumferential face of the inlet tube 1 to guide external air into the inlet tube 1. As shown in FIG. 4, eddy currents flowing circumferentially along an inner circumferential face of the inlet tube 1 are formed in the inlet tube 1. The eddy currents can change the airflow mechanism in the inlet tube 1.

The set of air-guiding holes 113 is arranged where the inlet tube 1 bends. However, there may be more sets of air-guiding holes 113. In a preferred case shown in the embodiment, the set of air-guiding holes 113 comprises a first air-guiding hole 113a and a second air-guiding hole 113b. The first air-guiding hole 113a is arranged over the inlet tube 1 and provides an air-guiding effect for the inlet tube 1, avoiding high air pressure from forming above the inlet tube 1 when the wind blows over the inlet tube 1. This allows the air to enter the inlet tube 1 with greater smoothness. The inlet tube 1 forms a throat 114 where the inlet tube 1 bends. The second air-guiding hole 113b is formed at the throat 114 to provide another air-guiding effect for the inlet tube 1, avoiding turbulence from forming at the throat 114 when the incoming air changes its direction at the throat 114.

The inlet tube 1 forms an intake air channel 13 preferably having a plurality of narrow portions 131 between the first end 11 and the second end 12 of the inlet tube 1. In this embodiment, the narrow portions 131 comprise a first narrow portion 131a and a second narrow portion 131b. In such an arrangement, the incoming air speeds up when passing through each narrow portion 131 due to the reduction in cross section of the intake air channel 13. Specifically, the intake air channel 13 has a fixed cross section between the first end 11 and a first predetermined location L1 near the first narrow portion 131a. The cross section of the intake air channel 13 starts to reduce in a gentle way from the predetermined location L1 to the first narrow portion 131a. After the first narrow portion 131a, the cross section of the intake air channel 13 starts to gradually increase until a second predetermined location L2 is reached. Between the second predetermined location L2 and a third predetermined location L3, the intake air channel 13 has another fixed cross section. Then again, the cross section of the intake air channel 13 starts to reduce in a gentle way from the third predetermined location L3 to the second narrow portion 131b. After the second narrow portion 131b, the cross section of the intake air channel 13 starts to increase all the way to the second end 12. In this embodiment, the second narrow portion 131b has a larger cross section than the first narrow portion 131a, but is not necessarily the case. Specifically, the intake air channel 13 has a smallest cross section at the first narrow portion 131a, as well as a second smallest cross section at the second narrow portion 131b, with the second smallest cross section of the second narrow portion 131b being larger than the smallest cross section of the first narrow portion 131a but smaller than the cross sections of other portions of the intake air channel 13.

The outlet tube 2 receives the inlet tube 1 and has an opening end 21 and a closed end 22. The opening end 21 has a windward opening 211 and an air-guiding opening 212. The windward opening 211 is higher than the air-guiding opening 212 in order to form an air-pulling effect that facilitates expelling air from the wind power generator. An exhaust channel 23 is formed between the inlet tube 1 and the outlet tube 2, with a gap 121 formed between the closed end 22 of the outlet tube 2 and the second end 12 of the inlet tube 1, such that the intake air channel 13 can communicate with the exhaust channel 23 via the gap 121.

The electricity-generating assembly 3 is disposed in the intake air channel 13. In this embodiment, the electricity-generating assembly 3 includes a first axial-flow generator 31 and a second axial-flow generator 32. The first axial-flow generator 31 has a blade unit 311 and a generator 312. The second axial-flow generator 32 has a blade unit 321 and a generator 322. The first axial-flow generator 31 is preferably disposed in the first narrow portion 131a of the intake air channel 13. The second axial-flow generator 32 is preferably disposed in the second narrow portion 131b of the intake air channel 13. In this arrangement, the first axial-flow generator 31 may be driven by incoming eddy currents first. The eddy currents then drive the second axial-flow generator 32. The blade unit 311 of the first axial-flow generator 31 and the blade unit 321 of the second axial-flow generator 32 are preferably set in a direction facing the incoming eddy currents, so that the blade units 311 and 321 may be efficiently driven to generate shaft work. The shaft work is then converted into electricity by the generators 312 and 322. The generated electricity is sent to an external storage device, completing the electricity generation.

Figure 5:
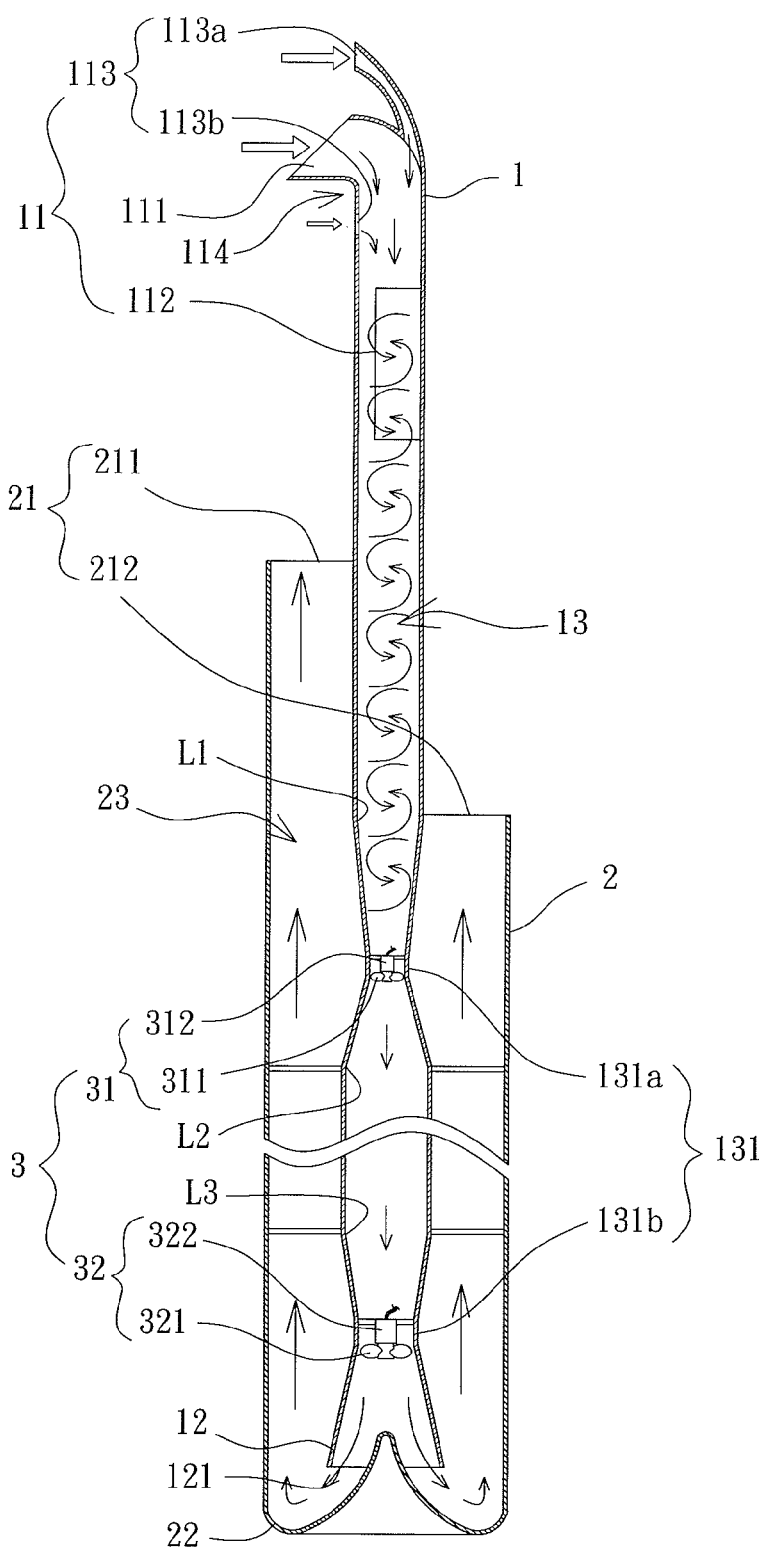
FIG. 5 shows an airflow path of the eddy-type wind power generator of the invention.

Referring to FIG. 5, the inlet 111 of the wind power generator collects and guides air into the intake air channel 13. Through the air-guiding effects provided by the first narrow portion 131a and the second narrow portion 131b, high pressure turbulence effect that takes place where the inlet tube 1 bends may be reduced. This allows the incoming air to flow in the intake air channel 13 with greater smoothness. After the incoming air passes through the bend of the intake air channel 13, the incoming air encounters the eddy currents introduced by the eddy opening 112. At this time, the incoming air interacts with the eddy currents to form an airflow spinning downwards. The spinning airflow is speeded up when entering the first narrow portion 131a, driving the first axial-flow generator 31 to rotate. After the airflow passes through the first narrow portion 131a, the airflow encounters a smaller air resistance due to the gradually-increased cross section of the intake air channel 13. Based on this, the first narrow portion 131a can speed up the airflow again. Since the airflow spins down the intake air channel 13 against the inner circumferential face of the inlet tube 1, the airflow can concentrate on the blade unit 311 that is located in a position adjacent to the inner circumferential face of the inlet tube 1, thereby improving the electricity generation efficiency of the first axial-flow generator 31.

When the airflow passes through the first narrow portion 131a, the airflow flows straight down the intake air channel 13. Since the airflow still has some momentum left, it can drive the second axial-flow generator 32 to generate electricity, thus fully utilizing the residual momentum of the airflow. When the airflow enters the second narrow portion 131b, the airflow is speeded up due to the reduced cross section of the intake air channel 13. After the airflow passes through the second narrow portion 131b, the airflow encounters a smaller air resistance due to the increased cross section of the intake air channel 13 between the second narrow portion 131b and the second end 12. Therefore, the airflow speeds up again after the second narrow portion 131b, driving the second axial-flow generator 32 to rotate for double electricity generations.

Since the intake air channel 13 communicates with the exhaust channel 23 (via the gap 121 between the closed end 22 of the outlet tube 2 and the second end 12 of the inlet tube 1), the air in the intake air channel 13 is expelled via the windward opening 211 and the air-guiding opening 212. In a preferred case, the first windward opening 211 is set in a direction facing the wind, allowing the air expelled at the windward opening 211 to be brought to the air-guiding opening 212. Since the air-guiding opening 212 is lower than the windward opening 211, the air from the windward opening 211 interacts with the air of the air-guiding opening 212, creating relatively lower air pressure at the air-guiding opening 212. This enhances the air-pulling effect of the air-guiding opening 212. As a result, the air in the wind power generator can be pulled out by the air-pulling effect, speeding up the air circulation of the wind power generator. Thus, overall electricity generation efficiency is improved.

The eddy-type wind power generator of the invention is capable of reducing the high pressure turbulence effect taking place in the intake air channel by introducing eddy currents. Therefore, air can flow in the intake air channel with greater smoothness.

Although the invention has been described in detail with reference to its presently preferable embodiments, it will be understood by one of ordinary skill in the art that various modifications can be made without departing from the spirit and the scope of the invention, as set forth in the appended claims.

What is claimed is:

1. An eddy-type wind power generator comprising:
   an inlet tube extending from a first end to a second end in an axial direction, wherein the first end has an inlet, an eddy opening and first and second air-guiding holes, with an intake air channel formed inside the inlet tube and extending in the axial direction, wherein the inlet tube forms a throat where the inlet tube bends at the first end, wherein the second air-guiding hole is arranged above the inlet in the axial direction, wherein the first air-guiding hole is arranged at the throat below the inlet in the axial direction;
   an outlet tube receiving the inlet tube and having an opening end and a closed end, wherein an exhaust channel is formed between the inlet tube and the outlet tube, wherein a gap is formed between the closed end of the outlet tube and the second end of the inlet tube, and the exhaust channel communicates with the intake air channel via the gap; and
   an electricity-generating assembly disposed in the intake air channel of the inlet tube.

2. The eddy-type wind power generator as claimed in claim 1, wherein the eddy opening is arranged on an outer circumferential face of the inlet tube.

3. The eddy-type wind power generator as claimed in claim 1, wherein the intake air channel has a first narrow portion with a smallest cross section.

4. The eddy-type wind power generator as claimed in claim 3, wherein the intake air channel has a second narrow portion having a cross section larger than the smallest cross section of the first narrow portion.

5. The eddy-type wind power generator as claimed in claim 4, wherein the intake air channel has a gradually-increased cross section between the second narrow portion and the second end of the inlet tube.

6. The eddy-type wind power generator as claimed in claim 4, wherein the electricity-generating assembly comprises a first axial-flow generator disposed in the first narrow portion.

7. The eddy-type wind power generator as claimed in claim 6, wherein the electricity-generating assembly comprises a second axial-flow generator disposed in the second narrow portion.

8. The eddy-type wind power generator as claimed in claim 1, wherein the opening end has a windward opening and an air-guiding opening.

9. The eddy-type wind power generator as claimed in claim 8, wherein the windward opening is intermediate and spaced from the air-guiding opening and the bend.

10. The eddy-type wind power generator as claimed in claim 1, wherein the first and second guiding holes and the inlet are aligned in a same radial direction perpendicular to the axial direction.

* * * * *